(No Model.)

I. V. KELLY.
CULTIVATOR.

No. 497,883. Patented May 23, 1893.

WITNESSES:

INVENTOR:
Isaac V. Kelly
BY
Benj. G. Cowl
ATTORNEY.

UNITED STATES PATENT OFFICE.

ISAAC V. KELLY, OF HAVERHILL, ASSIGNOR OF ONE-THIRD TO JAMES D. FOSTER, OF IRONTON, OHIO.

CULTIVATOR.

SPECIFICATION forming part of Letters Patent No. 497,883, dated May 23, 1893.

Application filed March 2, 1893. Serial No. 464,380. (No model.)

*To all whom it may concern:*

Be it known that I, ISAAC V. KELLY, a citizen of the United States, residing at Haverhill, in the county of Scioto and State of Ohio, have invented certain new and useful Improvements in Cultivators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in cultivators, and its object is to provide a novel implement of this character, which shall possess superior advantages with respect to simplicity and efficiency in use.

The invention consists in the novel construction and combination of parts hereinafter fully described and claimed.

Figure 1:
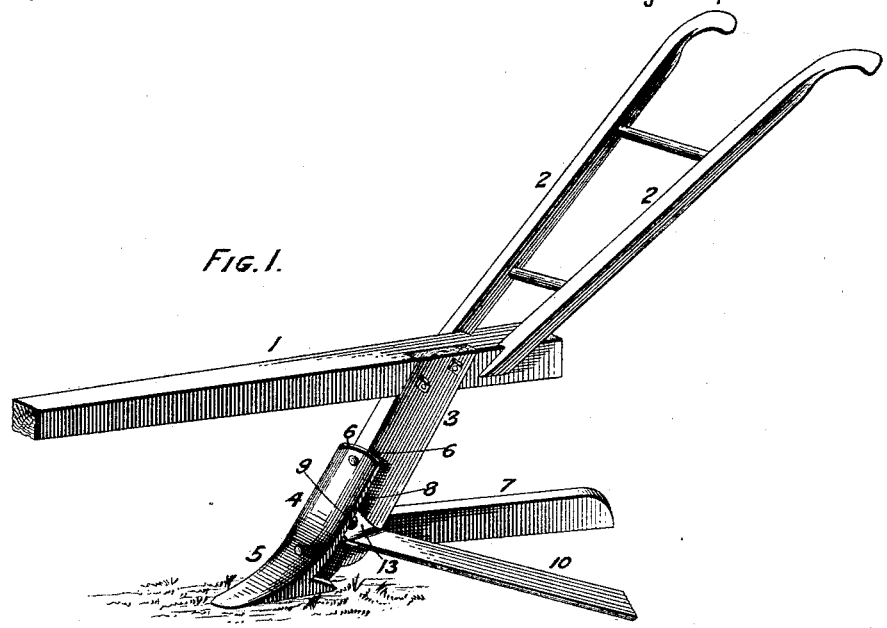
Figure 2:
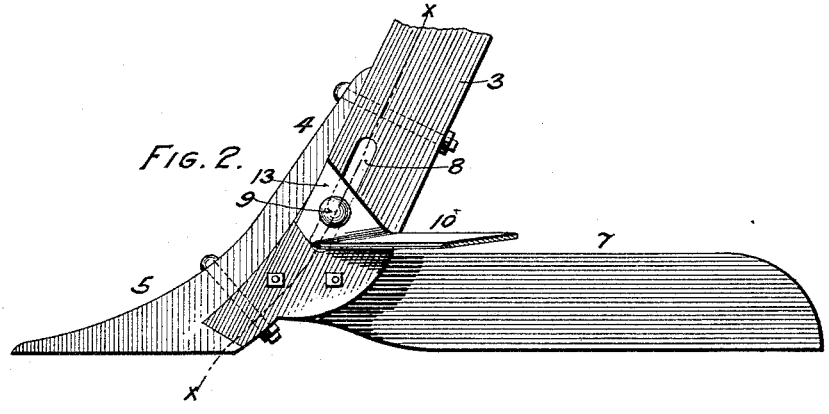
Figure 4:
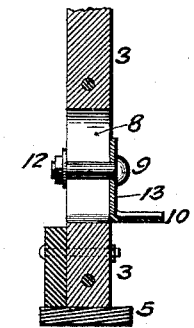
Figure 3:
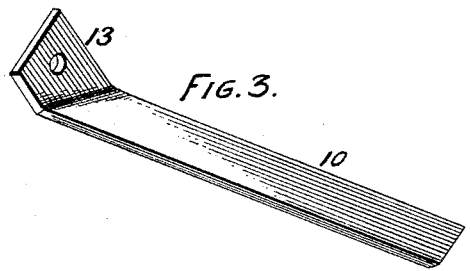

In the accompanying drawings, Figure 1 is a perspective view of a cultivator constructed in accordance with my invention. Fig. 2 is a detail elevation the cutting blade being partly removed. Fig. 3 is a detail perspective view of the cutting blade. Fig. 4 is a sectional view on the line $x$—$x$ of the lower portion of the standard, the share being removed.

In the said drawings, the reference numeral 1 designates the plow beam, 2 the handles and 3, the standard, which may be of any ordinary or suitable construction. In this instance the standard is shown as being curved at its lower end, and to it is bolted the shank 4, of the share 5, the edges of the shank extending beyond the sides of the standard forming flanges 6, against one of which the inner end of the cutting blade abuts. The numeral 7 designates the land side consisting of a metal plate secured at its front end to the lower end of the standard. The standard is provided with a slot 8, to receive a bolt 9, by which the outwardly extending adjustable cutting blade 10, is secured thereto. The inner end of this blade is bent upwardly on a diagonal line so that its inner end will bear against the edge or flange of the share shank; said end being beveled or curved to conform to the contour of said shank.

The bolt by which the blade is secured to the standard is provided with a binding nut 12. It will be noted that the blade is inclined rearwardly and horizontally with its front or cutting edge slightly downward.

The operation will be readily understood. The implement is run between rows cultivating the ground in the usual manner and the cutting blade which runs under the surface of the ground at any desired depth severing or cutting any weeds or plants between the rows leaving them on the surface of the ground to perish. The action of the blade also breaks the surface so that evaporation is retarded. The landside prevents the implement from sheering off when the blade encounters large plants or weeds. By reason of the upturned end of the blade fitting snugly up against the lapping edges of the share shank the blade is securely held in place so that its edge will always be in proper position for effective work.

By adjusting the blade by means of the slot, the bolt and the binding nut, it may be made to cut deeper or closer to the surface as desired.

The upturned inner end or lug 13 of the blade is provided with a hole for the passage of the bolt 9.

Having thus described my invention, what I claim is—

In a cultivator the combination with the standard having a slot at its lower end the landside and the share bolted to said standard with the edges of its shank overlapping the sides thereof, of the rearwardly and horizontally extending cutting blade having its inner end bent upwardly on a diagonal line forming a lug with the forward edge beveled or rounded to conform to the contour of the share shank, the screw bolt passing through a hole in said lug and the slot in the standard, and the binding nut, substantially as described.

In testimony whereof I affix my signature in presence of two witnesses.

ISAAC V. KELLY.

Witnesses:
GEO. H. DAVIES,
T. D. SHIRHY.